Jan. 25, 1966
H. W. HUFFMAN
3,231,261
METHOD OF AND MEANS FOR FABRICATING BOOKLETS
FROM CONTINUOUS WEBS
Filed Sept. 11, 1963
4 Sheets-Sheet 1
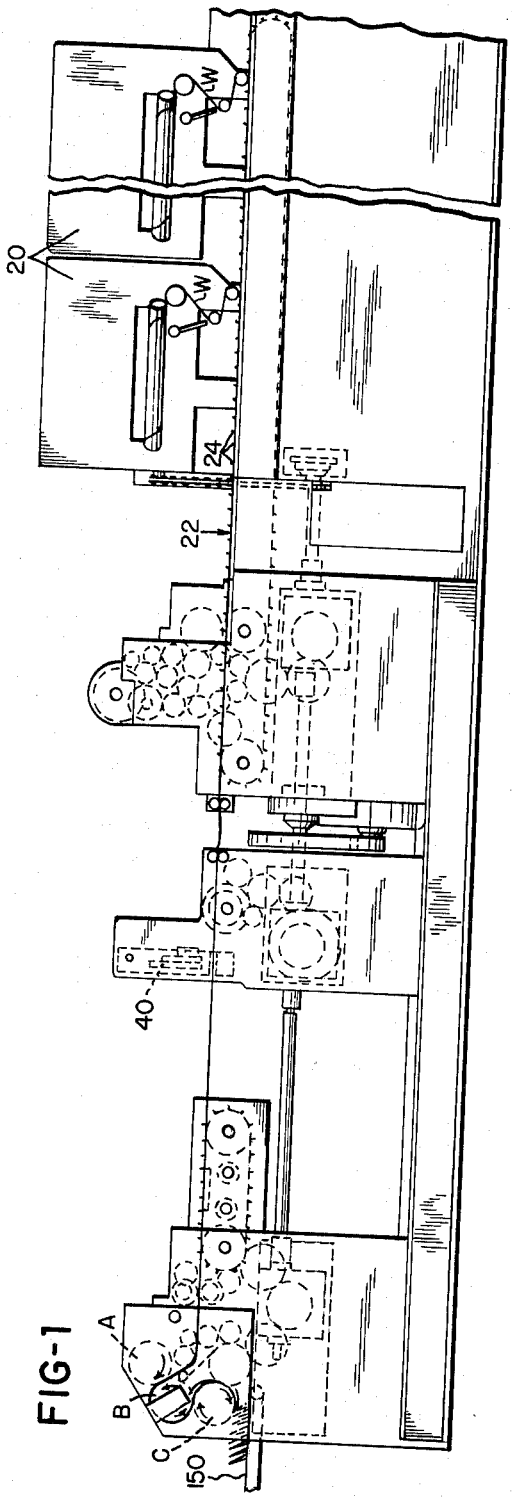
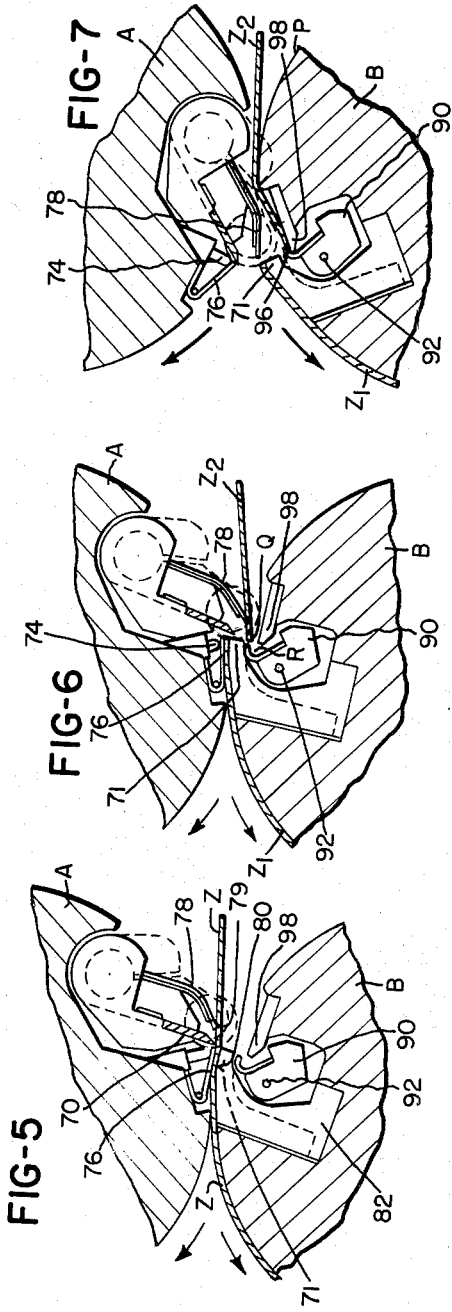
INVENTOR.
HAROLD W. HUFFMAN
BY
*Kinney & Schenk*
ATTORNEYS

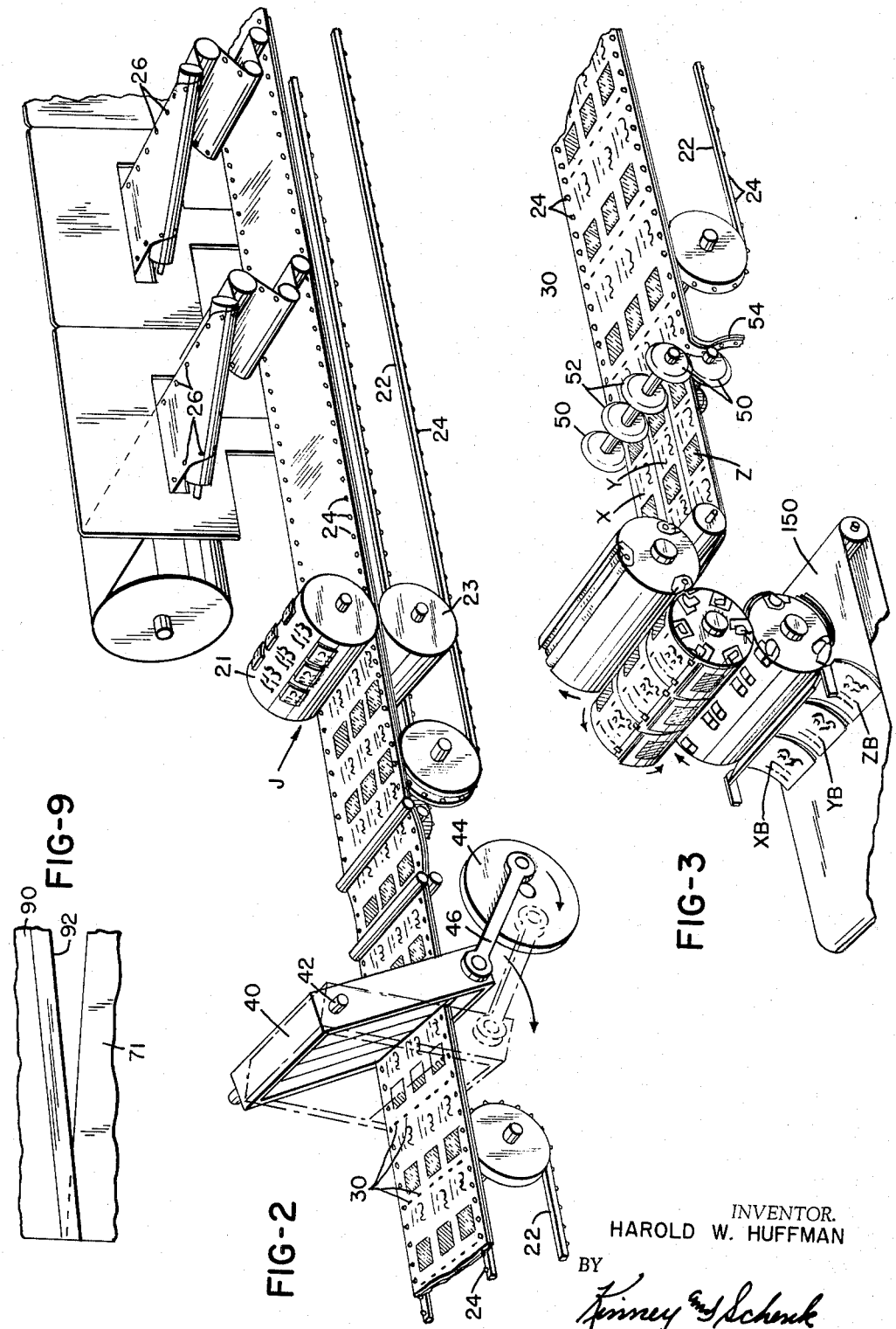

Jan. 25, 1966  H. W. HUFFMAN  3,231,261
METHOD OF AND MEANS FOR FABRICATING BOOKLETS
FROM CONTINUOUS WEBS
Filed Sept. 11, 1963  4 Sheets-Sheet 3

INVENTOR.
HAROLD W. HUFFMAN
BY
*Kinney and Schenk*
ATTORNEYS

Jan. 25, 1966
H. W. HUFFMAN
3,231,261
METHOD OF AND MEANS FOR FABRICATING BOOKLETS FROM CONTINUOUS WEBS
Filed Sept. 11, 1963
4 Sheets-Sheet 4
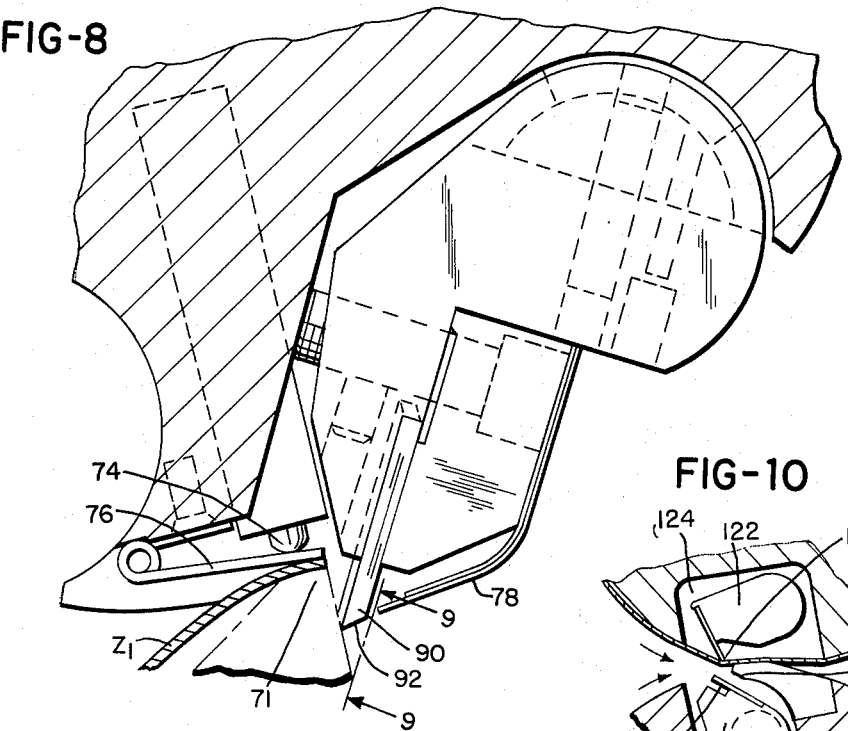
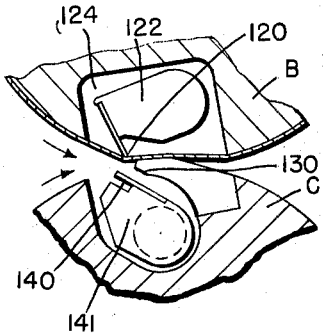
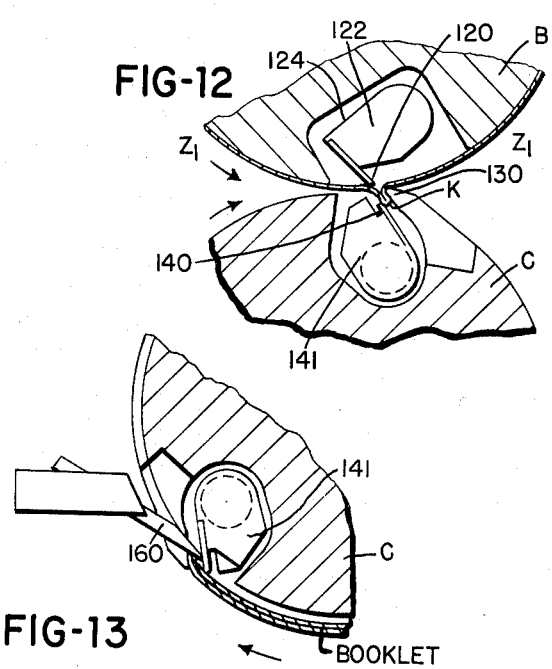
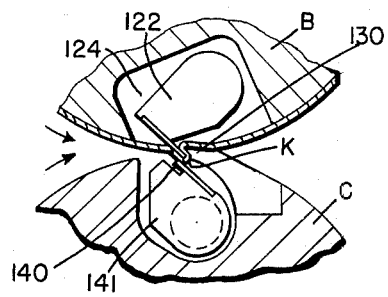
INVENTOR.
HAROLD W. HUFFMAN
BY
*Kinney & Schenk*
ATTORNEYS

United States Patent Office 3,231,261
Patented Jan. 25, 1966

3,231,261
METHOD OF AND MEANS FOR FABRICATING BOOKLETS FROM CONTINUOUS WEBS
Harold W. Huffman, Hamilton, Ohio, assignor to The Hamilton Tool Company, Hamilton, Ohio, a corporation of Ohio
Filed Sept. 11, 1963, Ser. No. 308,243
7 Claims. (Cl. 270—4)

This invention relates to apparatus for and method of making booklets.

An object of the invention is to provide means for automatically and continuously fabricating booklets from continuous lengths of superposed, continuous, individual webs.

Another object of the invention is to provide fully automatic means for continuously fabricating booklets as aforesaid, from a continuous composite web comprising a plurality of continuous, individually printed webs, whereby the printing of any four pages of a booklet may be changed or altered without affecting the printing of the other pages, and wherein the color and/or stock of any four pages of the book, including the cover, may be expeditiously changed.

Heretofore booklets have been constructed using what is known in the art as publication-type-fold, wherein all of the pages of a book made from each publication-type-fold were, of necessity, alike and identical as to stock and color.

A further object of the invention is to provide simple, yet highly effective means for automatically and continuously fabricating booklets at rates up to 54,000 complete booklets per hour from a single machine.

Still a further object of the invention is to teach a method of fabricating completed booklets from a plurality of superposed webs.

These and other objects are attained by means described herein, and as disclosed in the accompanying drawings in which:

FIG. 1 is a side elevational view of a typical apparatus embodying the teachings of the present invention.

FIG. 2 is a perspective view illustrating certain steps of the subject process.

FIG. 3 is a perspective view illustrating other steps of the present invention.

FIGS. 5, 6 and 7 are fragmentary views illustrating the sequential operation of the web-severing and web-end-grasping phases of the device.

FIG. 8 is an enlarged fragmentary view illustrating details of the web-severing mechanism.

FIG. 9 is a view taken on line 9—9 of FIG. 8.

FIGS. 10, 11 and 12 are fragmentary views of co-operating portions of cylinders B and C of FIG. 4 illustrating the manner in which the sheets comprising a booklet are automatically folded incident to being transferred from cylinder B to cylinder C.

FIG. 13 is a fragmentary view illustrating a detail of the booklet-discharge mechanism of cylinder C.

Figure 4:
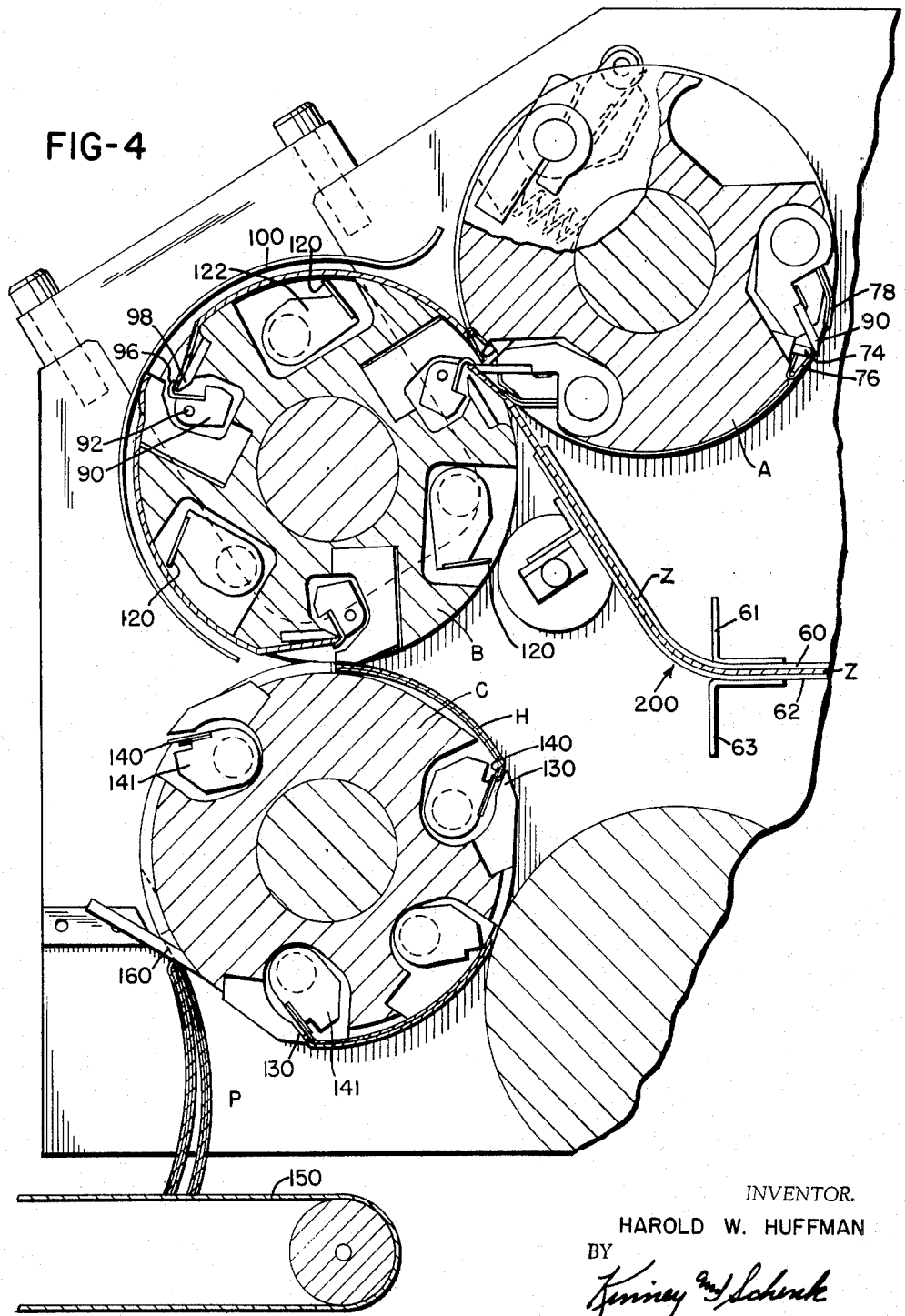
FIG. 4 is a side view, with portions thereof broken away and shown in section for clarity of detail and understanding of the web severing, folding and booklet releasing mechanism of the device of FIG. 1.

With particular reference now to FIGS. 1 and 2, the numerals 20 denote, generally two of a plurality of duplicate collating devices, each of which include suitable means, not pertinent to the present invention, for applying a continuous web W onto an endless conveyor denoted generally by the numeral 22. The conveyor is provided with laterally spaced outwardly projecting alignment pins 24 which are adapted to be received in aligned openings 26 along the side edges of each of webs W for thereby effectively and accurately aligning and conveying a plurality of individual webs in superposed relationship as a composite multi layer web.

The upper surface of the top most web may if desired be suitably imprinted as at J by imprinting plate cylinder 21 in conjunction with impression cylinder 23.

The composite web consisting of a plurality of individual continuous webs or sheets W may be then advanced forwardly and subjected to the action, as by way of example, of a transverse line of stitching 30 applied to the composite web as it is being advanced, by means of a swinging stitcher denoted generally by the numeral 40.

Uniformly satisfactory results have been obtained in those instances wherein the stitcher mechanism has been suspended from and mounted for pivotal movement about a fixed axis 42. Suitable means, such as a crank 44 may be utilized to impart an oscillatory motion to stitcher 40 by means of crank arm 46, it being understood that the action of crank 44 is so correlated with the linear rate of travel of the composite web as to advance the stitcher in unison therewith for enabling a row of staples 20 to be applied for securing the individual sheets of the composite web together as the web is continuously being advanced from right to left, as viewed in FIGS. 1–3.

The now transversely interconnected continuous sheets which collectively constitute the composite web are then advanced to be subjected to the action of a plurality of slitters 50 and 52. Slitters 50 are adapted to sever an edge strip 54 which contains the side openings, line holes or teletype punchings 26 of the individual sheets of the composite web; whereas slitters 52 are utilized to longitudinally subdivide the composite web into, by way of example, three continuous sub-assemblies X, Y and Z.

The composite sheets of each of sub-assemblies X, Y and Z are simultaneously subjected to the following operations which result in the sheets of said sub-assemblies being formed into completed booklets XB, YB and ZB, said booklets being automatically and continuously deposited onto the upper surface of an endless conveyor 150 with their closed edge uppermost.

With particular reference now to FIG. 4, the letter Z denotes composite web Z of FIG. 3 which is fed between cylinders A and B after passing between adjacent guiding surfaces of guide strips 60 and 62, guide strip 60 is illustrated as being supported by transverse member 61 which is suitably adjustable toward and from guide strip 62 which latter strip is fixedly mounted to transverse member 63.

Cylinder A may be considered the cut off cylinder; cylinder B the web-anchoring cylinder and cylinder C the web-folding cylinder.

As illustrated cylinders A, B and C have common circumferences which are a multiple of the overall width of an open booklet fabricated from the composite webs fed thereto.

As best illustrated in FIG. 8, cylinder A includes a rotatable knife blade 90, the cutting edge 92 of which is, as illustrated in FIG. 9, inclined for providing a scissors or shearing effect with the knife edge of a complementary fixed blade 71 carried by cylinder B. The numeral 74 indicates a spring-loaded plunger which bears against and maintains guide plate 76 in the fully advanced position illustrated in FIG. 8 for maintaining the trailing edge of a transversely severed sub-assembly in contact with the fixed blade 71. The numeral 78 denotes a guide stripper member which, as will hereinafter become more fully apparent, is operative for introducing the leading severed edge of a composite web to clamping means carried by cylinder B.

With particular reference now to FIGS. 5, 6 and 7, in FIG. 5 blade 90 has been illustrated with cutting edge at the start of a severing cycle whereby web Z is severed into sub-webs $Z_1$ and $Z_2$, of FIGS. 6 and 7. It will be noted that the trailing end of those portions of the web immediately in advance of (to the left of) blade 90 are held by guide plate 76 against outer face 80 of block 82 which is secured to and carried by cylinder B.

It will also be noted that tip 79 of guide stripper member 78 is positioned at and engages the leading edge of what will become strip $Z_2$. Further rotation of cylinders A and B from positions illustrated in FIG. 5 to those of FIG. 6 will result in the leading end Q of strip $Z_2$ being positively lowered by stripper 78 into throat R of a clamp jaw 90' which is mounted for pivotal movement about transverse shaft 92'.

Further rotation of cylinders A and B to the position illustrated in FIG. 7 will result in cam bar 90' being rotated in a clockwise direction for securing leading edge Q of web $Z_2$ in throat R and between lip 96 and the co-operating surface of fixed clamp blade 98 which transversely spans and is secured to and carried by cylinder B.

From the foregoing it will be noted that the leading edge of each web, as it is severed is securely held and anchored to cylinder B for rotation therewith, it being understood that rotation of cylinder B in a counter-clockwise direction will cause those portions of web $Z_2$, remote from leading edge Q to wrap around and lay on outer surface P of cylinder B.

A shield or guide plate 100 may be disposed in spaced relationship with portions of the third and fourth quadrants of cylinder B as illustrated in FIG. 4 for precluding the accidental or unintentional displacement of a web-segment from cylinder B.

It should be understood that the staples 30 of severed web $Z_1$ are located intermediate its leading and trailing edge.

With particular reference now to FIG. 10 it will be noted that a fold-forming blade 120 secured to and carried by a transversely extending cam bar 122 received within transverse slot 124 of cylinder B is actuated outwardly, and in timed relationship with fixed and movable jaws 130 and 140, respectively of cylinder C for providing a fold in web $Z_1$ and of presenting said fold K to and between fixed jaw 130 and movable jaw 140 of cylinder C, note FIG. 11. Movable jaw 140 is secured to and carried by a transversely extending cam bar 141.

Further rotation of cylinders B and C results in withdrawal of blade 120 from the fold, which fold is securely maintained and carried between jaws 130 and 140 of cylinder C. It should be understood that relative rotation of cylinders B and C form the relationship illustrated in FIG. 12 and cause those portions of web $Z_1$ on opposite sides of fold K, and on opposite sides of staples 30, since fold K is substantially coincident with stapling 30, will withdraw those portions on opposite sides of the fold from cylinder B, it being understood that clamp 90' (see FIGS. 5–7) will have been actuated whereby to release the leading edge of web $Z_1$ incident to the formation of fold K therein.

The now completely folded booklet denoted by the letter H of FIG. 4 is then advanced with, incident to rotation of cylinder B until such time as jaw 140 is opened for releasing fold K at which time the completed booklet will be released from cylinder C in the upstanding position indicated by the letter U of FIG. 4.

An extractor blade 160 may be associated with cylinder C for insuring that each booklet will be released from cylinder B and deposited onto conveyor 150 after jaw 140 has been actuated to open position.

It should be understood that the present invention is neither concerned with nor directed to the particular means utilized in actuating the various cam bars, suitable means being conventional and well known in the art.

From the foregoing, it will be noted that the disclosed method and apparatus enable booklets to be effectively and efficiently manufactured at high speeds without sacrificing quality. The fact that each of the individual webs W which collectively comprise the composite web which, after being longitudinally divided and then transversely stapled comprise four pages of the printed booklet imparts extreme flexibility to the system and enables any four pages, as defined by a particular web W to be altered without in any way effecting the other individual webs.

Another and very important practical advantage is that the present apparatus and method enables the cover of booklets to be of a different stock or of a different weight of the same stock and/or of a different color from the other sheets of the book, simply by changing one of the webs which collectively comprise the composite web.

In the preferred embodiment of the invention the composite webs are presented to clamp 96 and blades 90 and 71 in such a manner as to insure the creation of a uniform feather to each half of the open side of a completed booklet.

As the individual webs of the composite web Z are flexed about the rounded portion 200 of guide plate 60 and 62 the upper webs will progressively feather forwardly relative to the lower webs and the composite web on cylinder A, however a reverse feathering will be imparted to the web on cylinder B. The cut made by blades 90 and 71 is a square cut which will permit the desired feathering to occur when the sheets of a book are folded.

From the foregoing it will be noted that I have thus provided simple yet highly effective means for effectively providing multi-page booklets from a plurality of continuous, individual superposed webs.

It will be also noted that I have disclosed a unique method of fabricating booklets from a plurality of individual continuous, superposed webs which enables the cover of the booklets to be changed as to substance and/or color of stock, and/or changed as to printing and make-up without altering or effecting any of the other individual webs which collectively constitute the composite web from which the booklets are fabricated. My method also enables any four pages of a booklet which are formed from an individual web to be altered as to subject matter, color, type of stock, etc. by merely changing one of the individual webs on the collator.

Another important feature of my method is that the final trim and cutting operations, heretofore essential in booklet making, have been completely eliminated. The booklet as finally folded is complete and ready for use without further processing of any kind.

It should be understood that various changes may be made, within the scope of the appended claims, without departing from the spirit of the invention.

What is claimed is:

1. Apparatus in combination with means for advancing a contiuous composite web comprising a plurality of continuous, individual, superposed webs transversely interconnected at intervals equal to the overall width of an open booklet, of a booklet-forming unit comprising:
   (a) a set of three cylinders transversely mounted for rotation about parallel axes and arranged whereby a composite web received between the first two cylinders is fed onto the second cylinder and thence onto the third cylinder,
   (b) said first and second cylinders having cooperative means for transversely severing the composite web at intervals equal to the overall width of an open booklet for providing a plurality of interconnected sub assemblies,
   (c) said second cylinder having means for gripping the leading edge of each sub assembly for advancing it with said cylinder, said first cylinder having means for moving said leading edge toward the second cylinder immediately upon severance of the web and into position for engagement by said gripping means, (d) said second and third cylinders being approximately in peripheral engagement and having cooperative means for sequentially and transversely folding each sub assembly and then transferring each folded sub assembly from the second to the third cylinder, (e) and means for releasing the folded sub assemblies from said third cylinder as completed booklets.

2. Apparatus in combination with means for advancing a continuous composite web comprising a plurality of continuous, individual, superposed webs transversely interconnected at intervals equal to the overall width of an open booklet, of a booklet-forming unit comprising:

(a) a set of three cylinders transversely mounted for rotation about parallel axes and arranged whereby a composite web received between the first two cylinders is fed onto the second cylinder and thence onto the third cylinder, (b) said first and second cylinders having cooperative means for transversely severing the composite web at intervals equal to the overall width of an open booklet for providing a plurality of interconnected sub assemblies, (c) said second cylinder having means for gripping the leading edge of each sub assembly for advancing it with said cylinder, said first cylinder having means for moving said leading edge toward the second cylinder immediately upon severance of the web and into position for engagement by said gripping means, (d) said second and third cylinders being approximately in peripheral engagement and having cooperative means for sequentially and transversely folding each sub assembly and then transferring each folded sub assembly from the second to the third cylinder, (e) an endless conveyor having an upper reach spaced below said third cylinder, (f) and means associated with said third cylinder for releasing the folded sub assemblies as fully completed booklets onto said conveyor with their folded, closed-side edges uppermost.

3. Apparatus for making booklets comprising, in combination with means for advancing a continuous composite web comprising a plurality of continuous, individual, superimposed webs transversely interconnected at intervals equal to the overall width of an open booklet, of a booklet forming unit including a set of three cylinders, namely, a cut-off cylinder, a web-anchoring cylinder and a web-folding cylinder, mounted for rotation on parallel axes and having a positional relationship to one another whereby a composite web received between the first or cut-off cylinder and the seocnd or web-anchoring cylinder, is fed onto the said second cylinder and thence onto the said third cylinder, the said first cylinder having a pocket extending longitudinally thereof, a movable knife blade disposed within and longitudinally of said pocket, said second cylinder having a longitudinally extending pocket therein, a fixed jaw, a movable jaw cooperative therewith and a fixed blade disposed within and longitudinally of the said pocket in the second cylinder, means supporting said movable blade for movement relative to said second cylinder to sever a composite web fed between the rotating cylinders at intervals equal to the overall width of an open booklet, said movable jaw being adapted for movement relative to the first and second cylinders and to said cooperative fixed jaw, during rotation of the latter cylinders for clamping the leading edge of the severed composite web between said cooperative fixed and movable jaws for securing the composite web to and for movement with the second cylinder, said second cylinder having a second pocket extending longitudinally thereof and disposed to have a clamped composite web lie thereover, a tucker blade mounted in and extending lengthwise of said second pocket, said tucker blade being movable for advancement from its pocket to engage the said overlying composite, severed web midway between its clamped leading edge and its trailing edge for defining the location of a starting transverse fold in said severed web, said third cylinder having a longitudinally extending pocket therein, a fixed jaw and a movable jaw mounted for cooperative action in said pocket of said third cylinder, said last mentioned movable jaw being adapted for movement relative to the last mentioned fixed jaw during relative rotation of the second and third cylinders for clamping those portions of the web at the said started transverse fold formed by the tucker blade, for creating a transverse crease in said web and for securing said web to and for movement with the third cylinder, the said movable jaw of the second cylinder when at a prescribed position of rotation of the second cylinder relative to the third cylinder releasing the leading edge of the web in a position to be engaged by the jaws of the third cylinder, and the jaws of the third cylinder releasing a completed booklet therefrom upon rotary movement of the third cylinder to a booklet releasing position, and means in association with the transverse pocket of the first cylinder for engaging the leading edge of a severed composite web and advancing such edge to and between the web-clamping jaws of the second cylinder.

4. Apparatus as described in claim 3 which includes means for feathering and presenting the advancing end of the continuous composite web into the bite of the first two cylinders such that the severed edges imparted to said web by the blades of said two cylinders are at substantial right angles to the flat longitudinal axis of said web.

5. Apparatus as described in claim 3 wherein the various transverse pockets and slots of the cylinders are duplicated around the periphery of said cylinders at intervals which are multiple of the overall open width of the booklet produced, said duplicate pockets and slots containing mechanisms for sequentially duplicating the various operations set forth in claim 3, whereby more than one booklet is formed for each complete revolution of the aforesaid cylinders.

6. The method of making a trim-free multi-page booklet having open side edges of the pages disposed in echelon relationship progressing outwardly from each cover page toward the centermost pages, which method comprises the uninterrupted successive steps of stack arranging a plurality of elongate sheets in parallel superimposed relationship to form an elongate composite strip, securing said composite strip of stacked sheets together on transversely directed lines at intervals spaced longitudinally of the strip and equal to the overall width of an open booklet, while continuously moving the strip longitudinally, bending the moving strip transversely at a predetermined location adjacent to the advancing end thereof to effect progressive forward feathering of upper sheets of the web relative to the lower sheets and cutting the web square across successively midway between said transversely directed lines to form successive opened out booklets, moving the successively formed opened out booklets, along an arcuate path such as to impart a reverse feathering to the sheets at the cut edges with the said lower of said sheets on the inside of the arc and then effecting folding of the opened out booklet on said lines with the said lower of said sheets forming the innermost pages of the booklet and thereby disposing the open side edges of the sheets in feathered or echelon relationship.

7. Apparatus for making completed booklets from a composite of continuous, individual superimposed elongate parallel sheets, comprising operatively connected successive units embodying a conveyor means for moving said composite of sheets longitudinally, means for securing said sheets together on transverse lines spaced longitudinally thereof at intervals equal to the overall width of an opened out booklet, said means being movable back and forth in the line of movement of the sheets for securing the sheets together as a continuous composite body and while the sheets are in movement, and a terminal unit consisting of an upper, intermediate and lower cylinder, said cylinders being supported for rotation on longitudinal axes and in substantially peripheral engagement, a plurality of elongate cutter blades extending longitudinally of the upper cylinder and recessed in the periphery thereof and movably supported for in and out motion toward the periphery of the intermediate cylinder, cutter blades carried by and extending longitudinally of the intermediate cylinder, the blades of the cylinders coacting to transversely cut the composite of sheets between said securing lines when the composite of sheets is fed between the upper and intermediate cylinders, guiding means for directing an advancing end of the composite of sheets between the upper and intermediate cylinders, said guiding means having a portion into which said end of the composite of sheets enters and said portion leading into a curved portion leading in turn into a straight end portion terminating adjacent to and directed into the bite between the upper and intermediate cylinders to introduce the said end of the composite of sheets into the bite in a plane perpendicular to a plane common to the axes of the upper and intermediate cylinders, to be cut transversely by coacting blades of said cylinders, means recessed in the surface of the intermediate cylinder on the trailing side of each cutter blade thereof for gripping a leading end edge of the composite of sheets after a preceding booklet forming portion has been cut off whereby another booklet forming portion of the composite of sheets is drawn by the rotating intermediate cylinder into position for cutting, a guide stripper carried by the upper cylinder adjacent to and on the trailing side of each knife thereof and operating to move the said leading end edge of said another booklet forming portion into said gripping means, a fold forming blade carried by said intermediate cylinder between a pair of gripping means and operative to press outwardly against a gripped booklet forming portion to form therein a transverse outwardly projecting fold crease after a predetermined extent of rotation of the intermediate cylinder, and means carried by the lower cylinder coordinated with the rotation of the intermediate cylinder for gripping a projecting fold crease and drawing the opened out booklet in folded or closed condition from the intermediate cylinder.

References Cited by the Examiner
UNITED STATES PATENTS

| | | | |
|---|---|---|---|
| 414,500 | 11/1889 | Cussons | 270—1 |
| 732,322 | 6/1903 | Spalckhaver | 270—37 |
| 1,252,768 | 1/1918 | Barber | 270—37 |
| 1,489,833 | 4/1924 | Keller | 270—4 |
| 1,941,754 | 1/1934 | Quick et al. | 83—323 |
| 2,706,628 | 4/1955 | Huck | 270—72 |
| 3,027,160 | 3/1962 | Witt | 270—52 |

EUGENE R. CAPOZIO, *Primary Examiner.*